(12) United States Patent
Jitsukawa

(10) Patent No.: US 6,714,405 B2
(45) Date of Patent: Mar. 30, 2004

(54) VIBRATION DAMPING APPARATUS FOR DAMPING EXTERNAL VIBRATIONS

(75) Inventor: Keiji Jitsukawa, Chiba (JP)

(73) Assignee: Sony Computer Entertainment Inc. (JP)

( * ) Notice: Subject to any disclaimer, the term of this patent is extended or adjusted under 35 U.S.C. 154(b) by 32 days.

(21) Appl. No.: 10/139,793

(22) Filed: May 6, 2002

(65) Prior Publication Data

US 2002/0179807 A1 Dec. 5, 2002

(30) Foreign Application Priority Data

May 31, 2001 (JP) ........................................ 2001-163989

(51) Int. Cl.$^7$ ................................................ G06F 1/16
(52) U.S. Cl. ........................ 361/683; 361/679; 361/680; 248/638; 369/75.1
(58) Field of Search ..................... 361/683, 685, 361/690, 686, 725, 829; 312/723.2, 223.2; 360/97.02, 98.01, 135; 248/633, 636, 686, 688, 632, 634, 637, 638, 678; 428/134, 136, 137, 138, 64.1, 64.2, 64.3, 64.4, 65.3, 220; 369/263, 283, 287, 288; 430/279, 495, 945

(56) References Cited

U.S. PATENT DOCUMENTS

| | | | | |
|---|---|---|---|---|
| 1,767,194 A | * | 6/1930 | Vollmer | 248/188.9 |
| 4,800,973 A | * | 1/1989 | Angel | 177/211 |
| 4,831,476 A | * | 5/1989 | Branc et al. | 360/97.02 |
| 4,923,158 A | * | 5/1990 | Saisho | 248/188.8 |
| 4,937,806 A | * | 6/1990 | Babson et al. | 369/75.1 |
| 5,964,579 A | * | 10/1999 | Tang et al. | 417/363 |
| 6,357,717 B1 | * | 3/2002 | Kennard, IV | 248/638 |
| 6,399,888 B1 | * | 6/2002 | Chen | 174/138 G |
| 6,498,719 B1 | * | 12/2002 | Bridges | 361/680 |

* cited by examiner

Primary Examiner—Michael Datskovsky
(74) Attorney, Agent, or Firm—Lerner, David, Littenberg, Krumholz & Mentlik, LLP

(57) ABSTRACT

A vibration damping apparatus is provided with a main body, an elastic deformation section provided on the main body, and a projection which is made to follow the actions of the elastic deformation section and deform in every direction. The elastic deformation section acts as a damper to enable the vibration damping apparatus to dampen external vibrations transferred to the projection. For that reason, in recording/reproducing apparatus and other electronic apparatus on which the vibration damping apparatus is installed, it is possible to realize a reduction in the time needed to write to and read from a recording medium.

20 Claims, 12 Drawing Sheets

WITHOUT PROJECTION
(A-DIRECTION)

WITH PROJECTION
(A-DIRECTION)

WITHOUT PROJECTION
(B-DIRECTION)

WITH PROJECTION
(B-DIRECTION)

WITHOUT PROJECTION
(C1-DIRECTION)

WITH PROJECTION
(C1-DIRECTION)

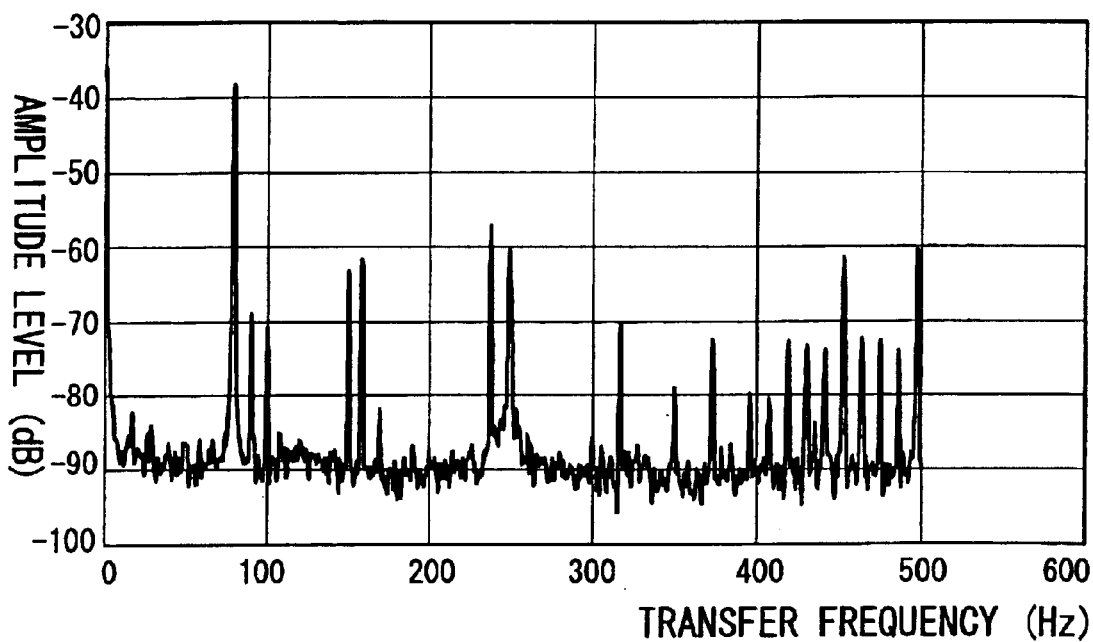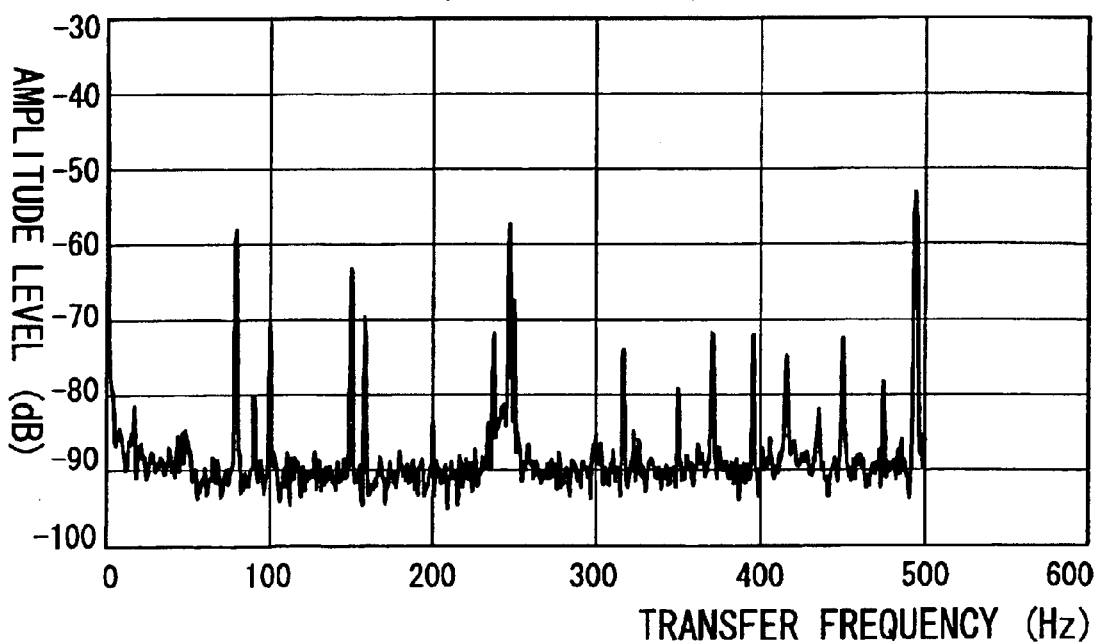

VIBRATION DAMPING APPARATUS FOR DAMPING EXTERNAL VIBRATIONS

CROSS REFERENCE TO RELATED APPLICATIONS

This application claims priority from Japanese Patent Application No. 2001-163989 filed on May 31, 2001, the disclosure of which is hereby incorporated by reference herein.

BACKGROUND OF THE INVENTION

The present invention relates to a vibration damping apparatus for damping external vibrations.

In a hard disk drive apparatus which records information to or reads information from magnetic storage discs, data is written into recording areas with compensation due to tracking servo control. For that reason, if the hard disk drive apparatus is subjected to external vibrations, it takes a long time for compensation by using the tracking servo control caused by the vibrations.

Accordingly, it has been proposed to attach an insulator, such as rubber, to the bottom of the hard disk drive apparatus as a countermeasure for damping the external vibrations. The insulator is generally attached on a flat installation surface. However, insulators attached on flat surfaces have difficulty damping external vibrations sufficiently. Thus, in some cases, it is impossible to reduce the writing time of data.

SUMMARY OF THE INVENTION

The present invention has been proposed to solve the above-mentioned problem, and an object of the present invention is to provide a vibration damping apparatus capable of damping external vibrations.

The vibration damping apparatus of the present invention includes a main body having one end adapted for connection to a separate apparatus and another end; a projection provided on the another end of the main body; and an elastic deformation section provided on the main body between the one end and the projections the projection being deformable by an action of the elastic deformation section.

In this vibration damping apparatus, since the projection is deformable following the action of the elastic deformation section, the elastic deformation section serves as a damper to dampen external vibrations transferred to the projection.

BRIEF DESCRIPTION OF THE DRAWINGS

The above and other features will be better understood from the exemplary embodiments described below, taken together with the drawings, in which:

FIG. 12A is a graph illustrating the transfer vibration characteristic in the C2 direction at the center of the hard disk drive apparatus as shown in FIG. 7 when the vibration damping apparatus does not include a spherical projection;

FIG. 12B is a graph illustrating the transfer vibration characteristic in the C2 direction at the center of the hard disk drive apparatus as shown in FIG. 7 when the vibration damping apparatus includes a spherical projection.

DETAILED DESCRIPTION

Preferred embodiments of the present invention are described in detail below, with reference made to relevant accompanying drawings.

General Outline of Present Embodiment

The vibration damping apparatus of the present invention is one in which there is provided an elastic deformation section and projection, and external vibrations are damped in such a way that the projection follows the action of the elastic deformation section, preferably with deformation in every direction.

Hereinafter, referring to the accompanying drawings, an example will be described in detail in which the vibration damping apparatus according to the present invention is installed on an external hard disk drive apparatus, the hard disk drive apparatus being connected to an entertainment apparatus of an overall entertainment system.

Outline Configuration of Entertainment System

Figure 1:
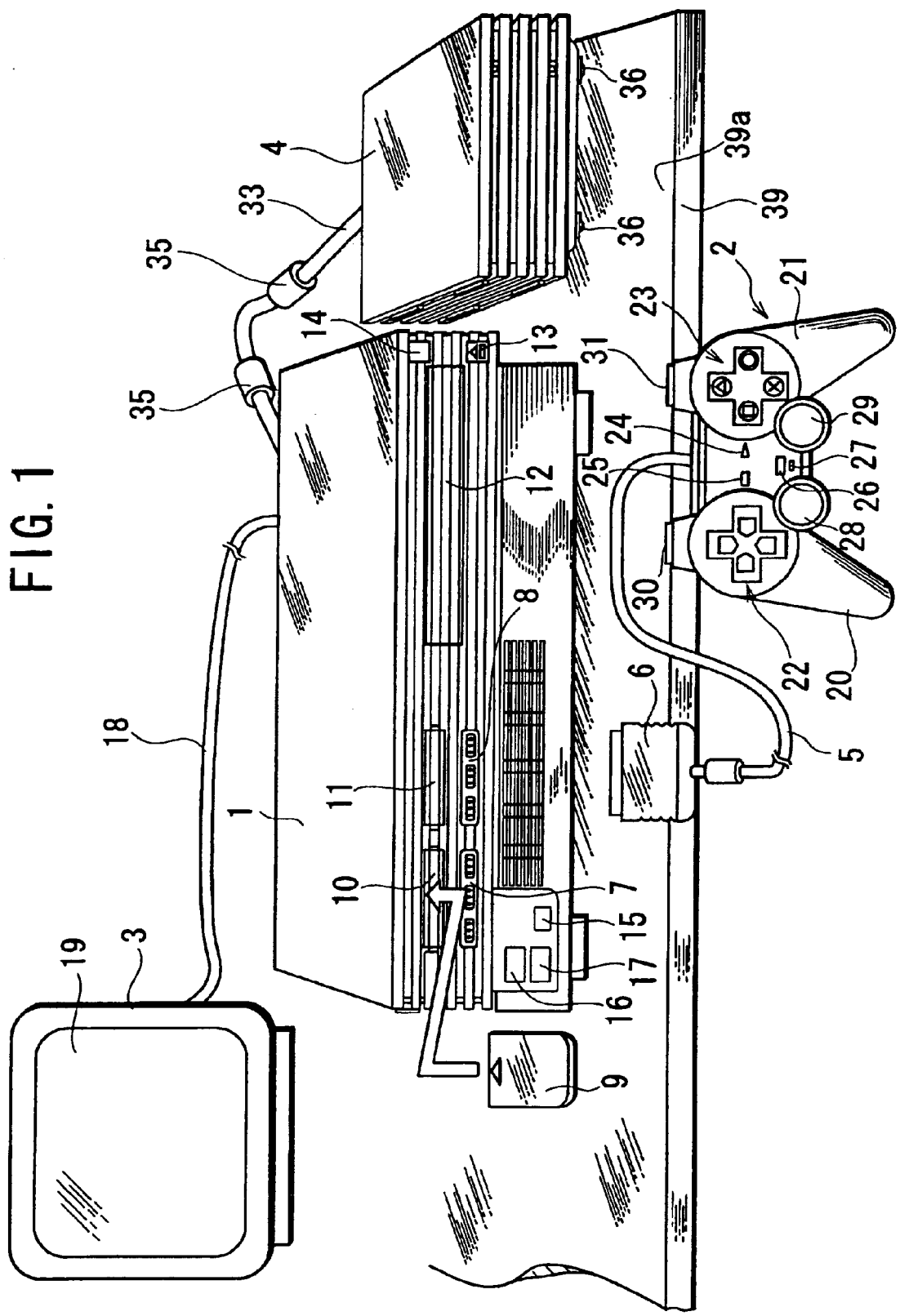
FIG. 1 is a perspective view illustrating an example in which a hard disk drive apparatus is placed next to an entertainment apparatus on the same desk.

The entertainment system, as illustrated in FIG. 1, is composed of an entertainment apparatus 1 capable of executing various kinds of video games, drawing up and editing electronic mail, accessing Web pages, and playing back movies or music; a controller 2 which serves as an operation terminal connected to the entertainment apparatus 1; a television monitor 3 for displaying game contents, electronic mail, Web pages, movies and so forth and outputting sound; and an external hard disk drive apparatus 4.

Entertainment Apparatus

The entertainment apparatus 1 executes various game application programs read out from a recording medium such as an optical disk, for example a CD-ROM or DVD-ROM, the hard disk of the hard disk drive apparatus 4, semiconductor memories and so forth, or which are downloaded via various communication circuits, such as telephone lines, a LAN, CATV lines, communication satellite lines and so forth. The entertainment apparatus also executes instructions from an operator received via the controller 2, and can create and edit e-mail and access Web pages, as well as reproduce (decode) video and audio data, such as audio data recorded on a CD, or video and audio data of a movie recorded-on a DVD.

As illustrated in FIG. 1, the front surface of the entertainment apparatus 1 is provided with two controller ports 7, 8 to which a connector 6 provided at the end of a cable 5 connected to the controller 2 may be detachably inserted; memory card slots 10, 11 into which memory card 9 may be removably inserted; and a disk tray 12 into which an optical disk, such as a DVD-ROM or CD-ROM, may be loaded. The front surface of the entertainment apparatus 1 is further provided with an open/close button 13 for opening or closing the disk tray 12; an on/standby/reset button 14 for switching the power supply on and off, setting the standby condition, and resetting a game; an IEEE (Institute of Electrical and Electronics Engineers) 1394 connecting terminal 15; two USB (Universal Serial Bus) connecting terminals 16, 17; and so forth.

In addition, the rear surface of the entertainment apparatus 1 is provided with a power switch, an audio and video output terminal (AV multiple output terminal), an optical digital output terminal, an AC power input terminal, a PC card slot and so forth (none of which are illustrated).

Television Monitor

The television monitor 3, as illustrated FIG. 1, is connected via cable 18 to the audio and video output terminal provided on the rear surface of the entertainment apparatus 1. The monitor screen 19 of the television monitor 3 displays the game contents, e-mail, Web pages, movies and so forth. In addition, game sound and the like are output from a speaker (not illustrated) of the television monitor 3.

Controller

The controller 2, as illustrated in FIG. 1, has a controller body having a left grip 20 and a right grip 21 that may be gripped by both hands while the operator operates the controller. Various kinds of operation buttons are provided on the upper surface or front surface of the controller body. Up, down, right and left direction instruction keys 22 are the provided on left upper surface of the controller body. These keys 22 are operated by the operator, for instance, to move a game character in the up, down, right and left directions on the monitor screen 19 in a video game; to move a character input cursor in the up, down, right and left directions on an e-mail formation screen; and to perform page scrolling and move a cursor in the up, down, right and left directions on a Web page. These up, down, right and left direction instruction keys 22 are operated by the thumb of the left hand of the operator when the controller is gripped by both hands.

In addition, on the right upper surface of the controller body, four instruction buttons 23 are provided, and respective different functions are allocated to the respective four instruction buttons 23 according to an application program. These functions may include, for instance, functions for specifying the display of a menu, for specifying the cancellation and so forth of selected items, for specifying the determination and so forth of selected items, and for specifying the display/non-display of a table of contents and so forth.

In addition, the center upper surface of the controller body is provided with a start button 24 for starting a game, displaying an e-mail screen, and playing back or pausing a movie or music; a select button 25 for instructing the display of a menu or an operation panel on the monitor screen 19; a mode selection switch 26 for selecting an operation mode; a light indicator 27 for displaying the selected operation mode; and right and left analog operation sections 28, 29 for conducting joy stick operations.

The front surface of the controller body is provided with right and left depressing buttons 30, 31 which may be depressed by the right and left first finger, respectively.

Hard Disk Drive Apparatus

Figure 2:
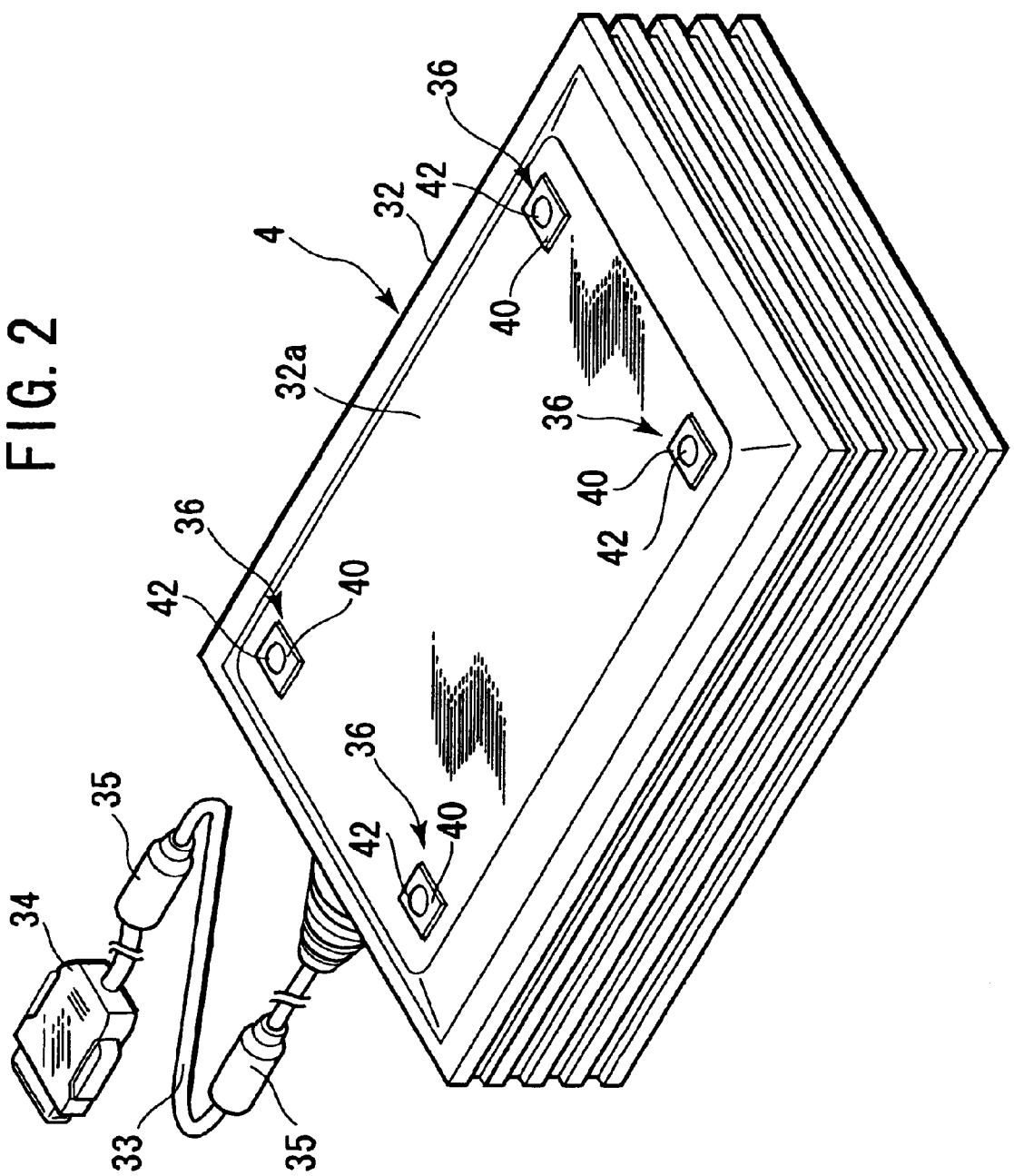
FIG. 2 is a perspective view of an external hard disk drive apparatus.

The hard disk drive apparatus 4 is connected to the PC card slot or accessory kit or so forth provided on the rear surface of the entertainment apparatus 1. The hard disk drive apparatus 4, as illustrated in FIG. 2, contains a hard disk drive (not illustrated) within a housing 32 which preferably has a rectangular body, and has a connection cable 33 connected, to the entertainment apparatus 1 from one side surface of the housing 32. At an end of the connection cable 33, a connector 34 is provided for connection to the PC card or accessory kit (not illustrated). In addition, cores 35 for noise reduction are installed on the connection cable 33.

The hard disk drive contained within the housing 32 reads game programs and application programs for e-mails or Web browsing stored in a data storage area of the hard disk, as needed, or writes data within a predetermined track area. Then, the hard disk drive is provided with a tracking servo control mechanism for writing data at desired recording track positions. The data is written at the desired track positions while being compensated by the tracking servo control mechanism. The vibration damping apparatus 36 is installed on the housing 32 in order to damp external vibrations generated from the entertainment apparatus 1.

Vibration Damping Apparatus

A vibration damping apparatus 36, as illustrated in FIG. 2, is provided in the vicinity of each of the four corners of the bottom surface 32a of the housing 32. The vibration damping apparatus 36, as illustrated in FIG. 3 to FIG. 6, is composed of a main body 37, an elastic deformation section 41 provided on the main body 37, and a projection 42 projecting from a mounting surface 40a of the main body 37 and deformable by the action of the elastic deformation section 41. The vibration damping apparatus 36 is preferably an elastic member formed by integrally molding a synthetic resin material composed of rubber and resin.

Figure 3:
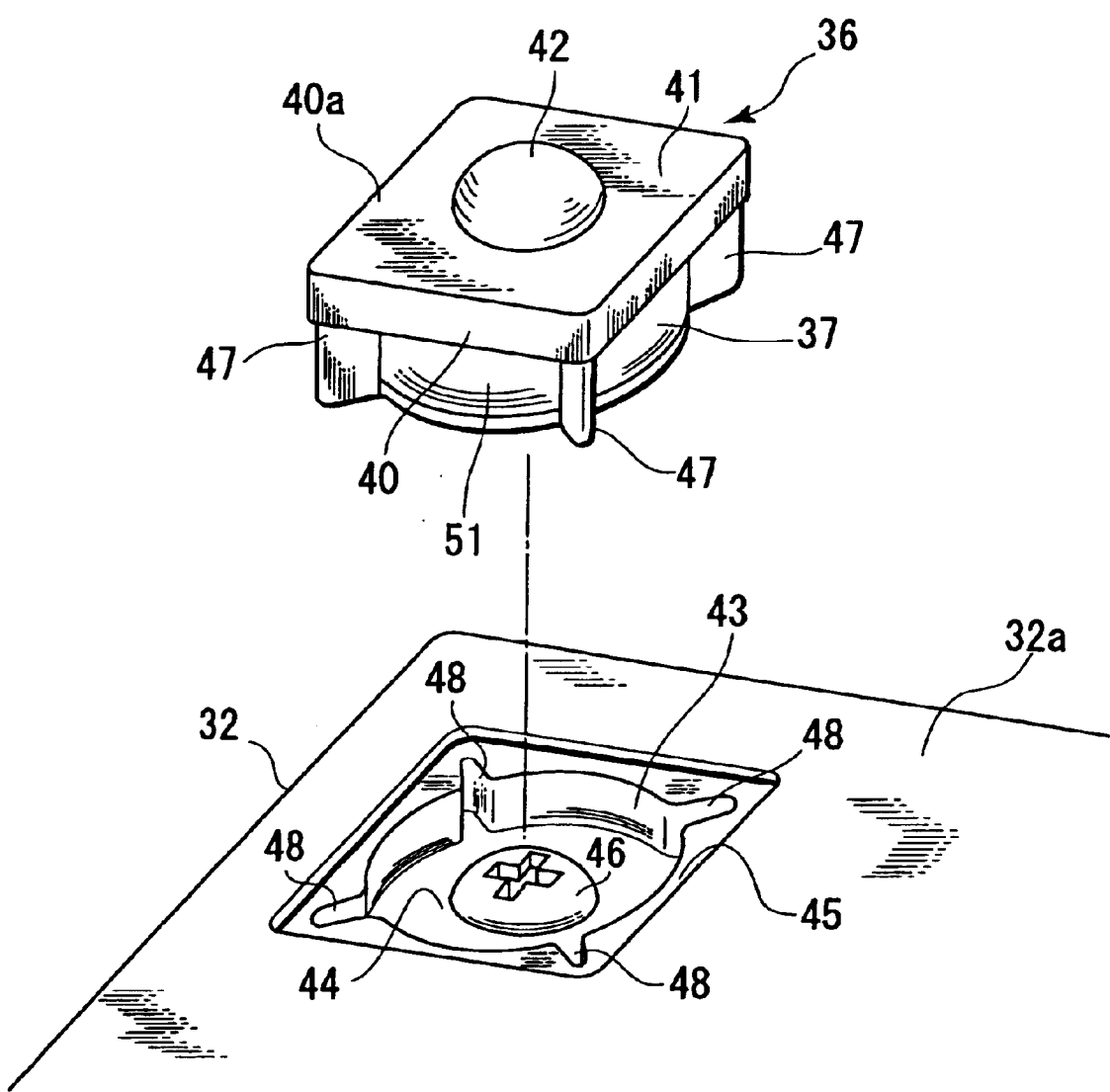
FIG. 3 is a partial enlarged exploded view illustrating the condition before the vibration damping apparatus of the present invention is installed on the housing of the hard disk drive apparatus.

The vibration damping apparatus 36, as illustrated in FIG. 3, is installed in such a way as to be fitted into one of several built-in concave sections 43 provided in the bottom surface 32a of the housing 32. Each built-in concave section 43 is formed as a depression having a bottom wall 44. An approximately rectangular-shaped step surface 45 corresponding to the shape of the upper portion of the main body 37 is formed near the opening of the built-in concave section 43. Four grooves 48 are formed in the step surface 45 and are oriented in a vertical direction relative to the bottom wall 44. Further, at the bottom wall 44, the head 46 of a fastening screw 46a for fastening together the upper and lower portions of housing 32 projects inside the built-in concave section 43.

Figure 6:
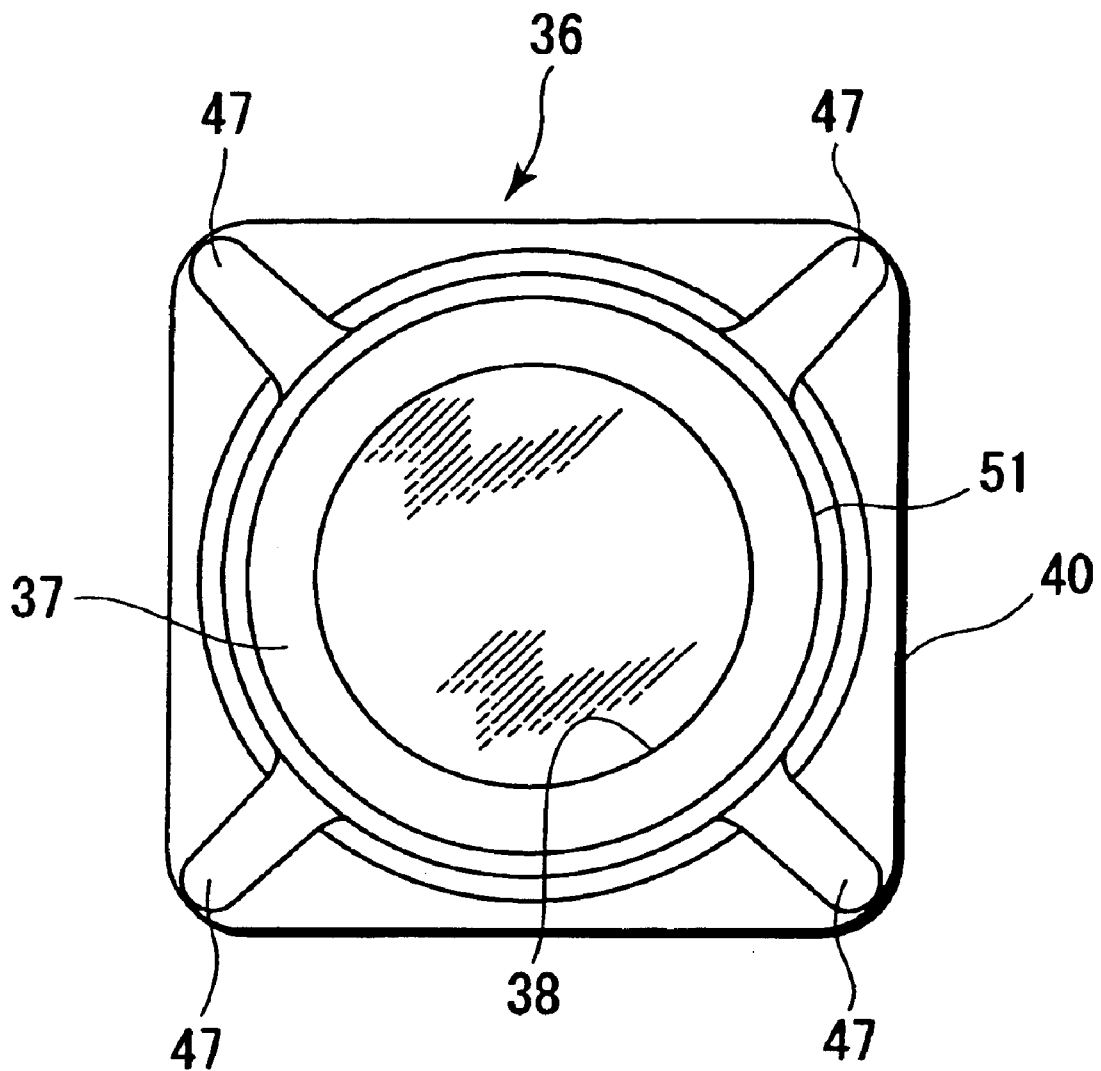
FIG. 6 is a bottom view of the vibration damping apparatus.

The main body 37, as illustrated in FIG. 3 and FIG. 6, has a cylindrical section 51 shaped to be inserted into the built-in concave section 43, a concave section 38 formed on the underside of the cylindrical section 51, and an approximately rectangular-shaped contact portion 40 formed on the upper end of the cylindrical section 51. Four projecting members 47 are provided on the outer circumferential surface of the cylindrical section 51 so as to retain the vibration damping apparatus in the built-in concave section 43. These projecting members 47 project toward the four corners of the rectangular-shaped contact portion 40, and are positioned to be received in the respective grooves 48 formed in the built-in concave section 43.

Figure 4:
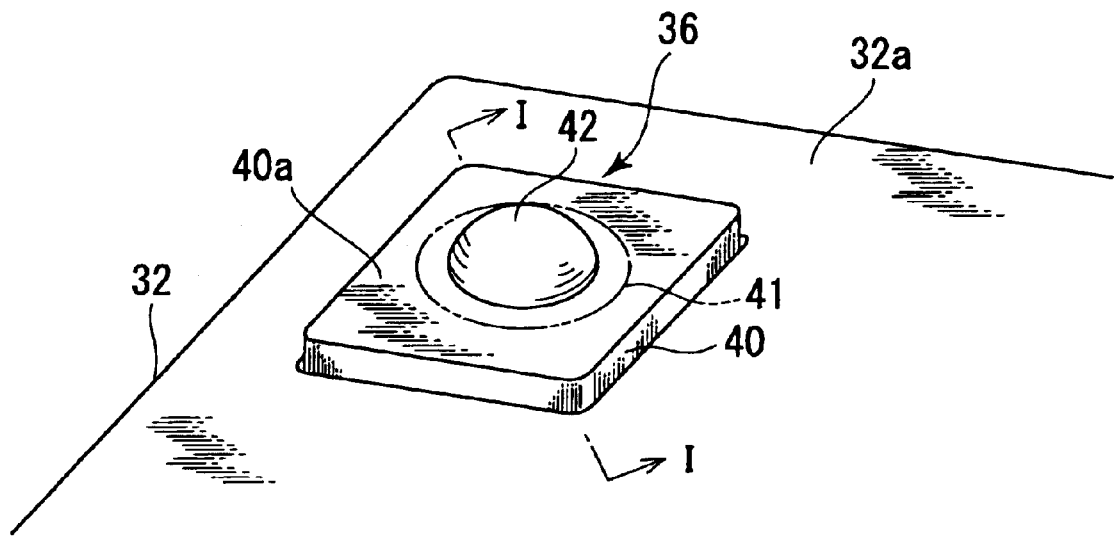
FIG. 4 is a partial enlarged perspective view illustrating the condition in which the vibration damping apparatus is installed on the housing of the hard disk drive apparatus.
Figure 5:
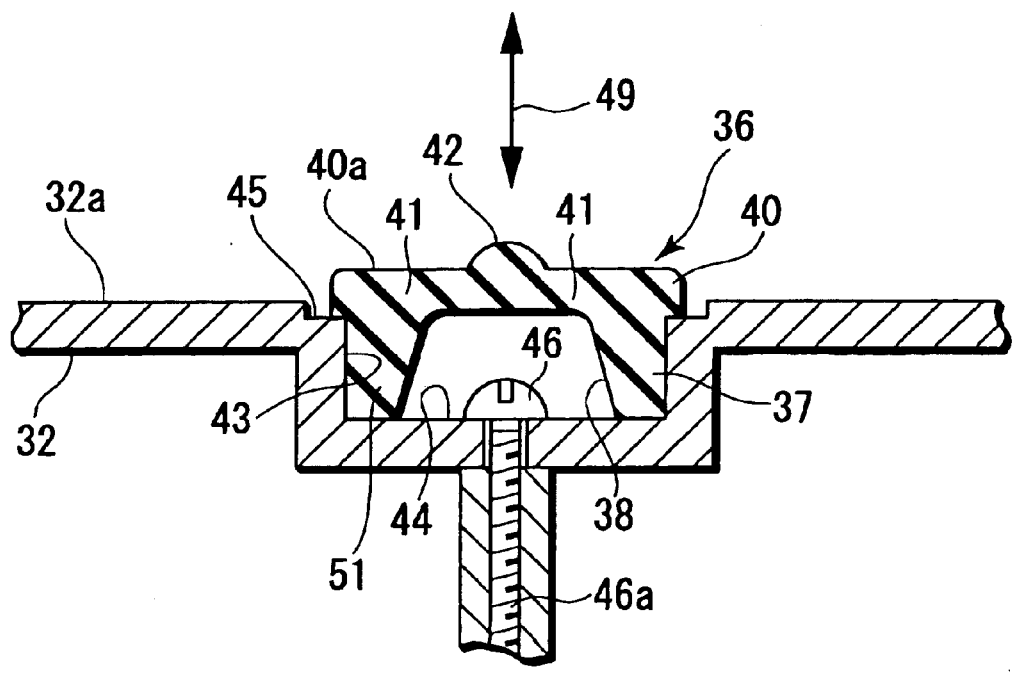
FIG. 5 is a cross-sectional view taken along line I—I of FIG. 4.

The concave section 38, as illustrated in FIG. 5, is formed at the cylindrical section 51 as a depression whose circular-shaped opening diameter becomes gradually smaller from the vicinity of the opening toward the contact portion 40. The contact portions 40 function as leg sections when placed on the surface 39a of a desk 39 and so forth on which the hard disk drive apparatus is placed. With the vibration damping apparatus 36 installed in housing 32, a placing surface 40a, which is the surface of the contact portion 40, projects from the bottom surface 32a of the housing 32. The projection 42 projects outwardly (toward the surface 39a of the desk 39) from approximately the center of the contact portion 40. The projection 42, as illustrated in FIG. 3 to FIG. 5, is preferably formed so that its surface has a spherical shape. More particularly, the projection 42 preferably has an approximately hemispherical shape.

The projection 42 is connected through the elastic deformation section 41 to the main body 37. The elastic deformation section 41, as illustrated in FIG. 4 and FIG. 5, is provided at the circumference of the projection 42 with an approximately toric shape (area indicated by the two-dotted chain line in FIG. 4). The toric-shaped elastic deformation section 41 has a thickness which is relatively thin in comparison to other portions of the main body 37, whereby the toric-shaped elastic deformation section 41 functions as a damper. Namely, when external vibrations are transmitted to the projection 42, the projection 42 follows the action of the elastic deformation section 41 with deformation in, for example, the up and down direction (direction indicated by arrow 49 in FIG. 5), thereby damping the external vibrations gradually.

Arrangement of Hard Disk Drive Apparatus and Vibration Damping Action

Figure 8:
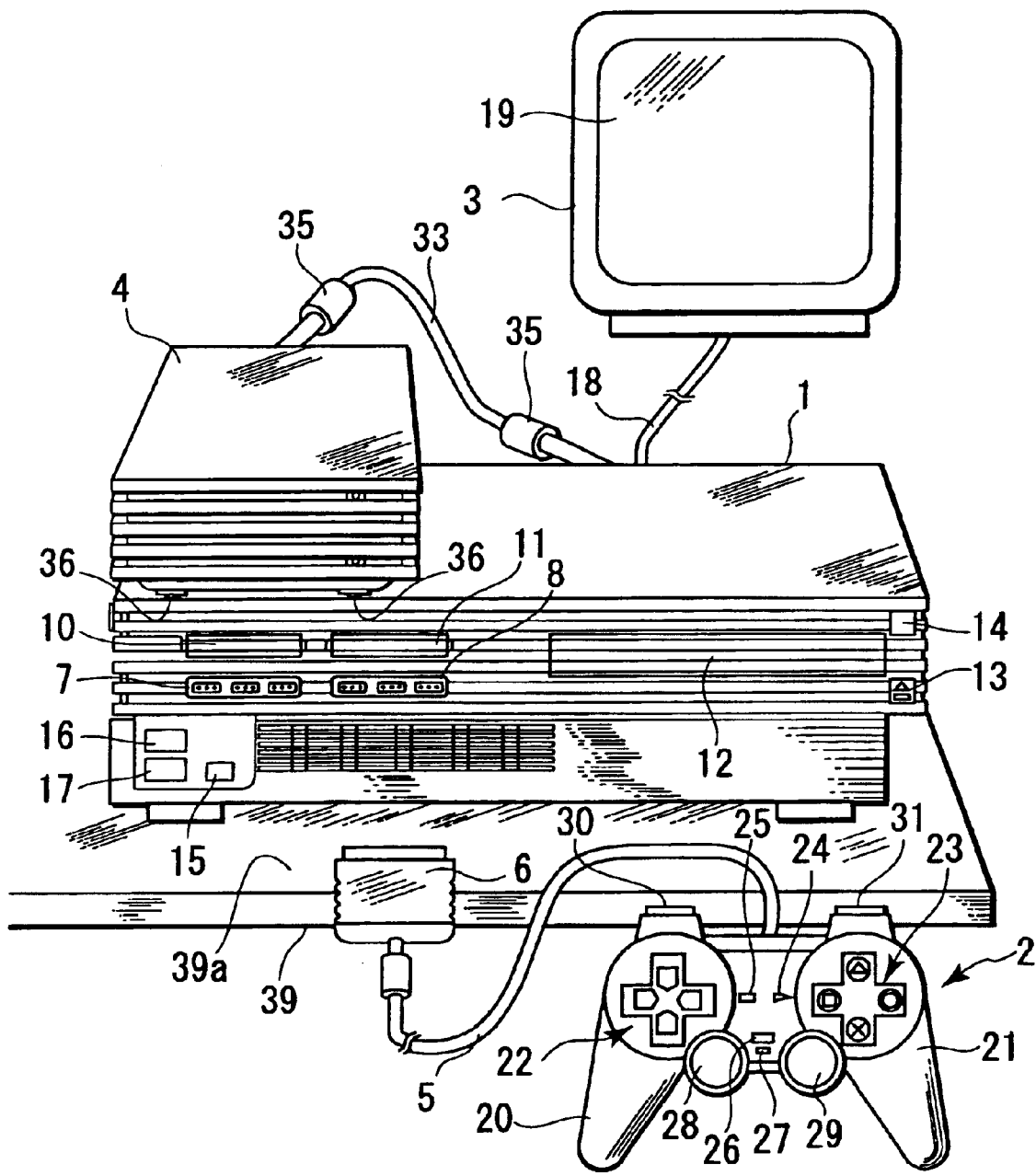
FIG. 8 is a perspective view illustrating an example of placing the hard disk drive apparatus on the entertainment apparatus.

The general arrangement condition of the hard disk drive apparatus 4, as illustrated in FIG. 1, is that the hard disk drive apparatus 4 is arranged next to the entertainment apparatus 1. In an unusual arrangement condition, the user places the hard disk drive apparatus 4 on the entertainment apparatus 1. When positioned in this manner, as illustrated in FIG. 8, vibrations generated when the DVD drive apparatus contained in the entertainment apparatus 1 is driven travel directly to the hard disk drive apparatus 4.

In any cases where the hard disk drive apparatus 4 is placed next to the entertainment apparatus 1 or placed on the entertainment apparatus 1, external vibrations generated from the entertainment apparatus 1 travel to the hard disk drive apparatus 4. The external vibrations transmitted to the hard disk drive apparatus 4 travel to the projection 42 of the vibration damping apparatus 36 installed on the bottom surface 32a of the housing 32. Then, the vibrations are gradually damped in such a way as to cause the projection 42 to follow the action of the elastic deformation section 41 with deformation in, for example, the up and down directions.

In particular, vibrations are damped even though the vibrations act not only from the right and left directions, but from every direction since the shape of the projection 42 is taken to be approximately spherical. For that reason, in cases where, in particular, the hard disk drive apparatus 4 is placed directly on the entertainment apparatus 1, large vibrations travel to the hard disk drive apparatus 4. However, by providing the vibration damping apparatus 36, it is possible to damp such vibrations within the range that writing or reading of data to the hard disk is not delayed. Namely, the vibration damping apparatus 36 dampens external vibrations so that the compensating time of the tracking servo control is reduced to allow a reduction of the writing time of data and reading time of data.

Vibration Damping Experimental Example

Figure 7:
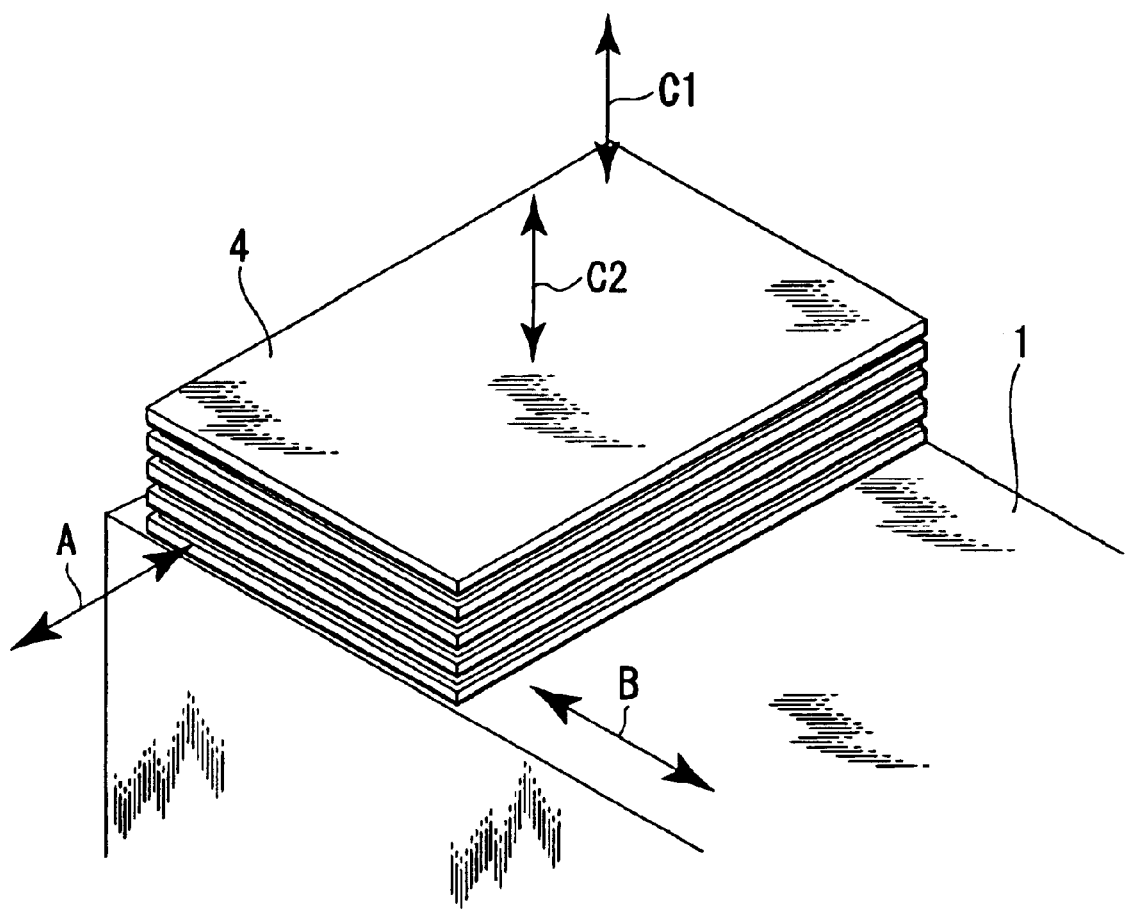
FIG. 7 is a perspective view illustrating the directions and positions at which vibrations traveling to the hard disk drive apparatus are measured.

Here, in cases where the hard disk drive apparatus 4 is placed on the entertainment apparatus 1, the vibrations that travel from the entertainment apparatus 1 to the hard disk drive apparatus 4 are measured. Measurement, as illustrated in FIG. 7, is conducted in the forward and backward directions of the hard disk drive apparatus 4 as denoted by arrow A, in the right and left directions of the hard disk drive apparatus 4 as denoted by arrow B, and in the vertical direction of the hard disk drive apparatus 4 as denoted by arrows C1 and C2. It should be noted that in the vertical direction c, vibration at a corner of the hard disk drive apparatus 4 is denoted by arrow C1, and vibration at the center of the hard disk drive apparatus 4 is denoted by arrow C2.

Figure 9A:
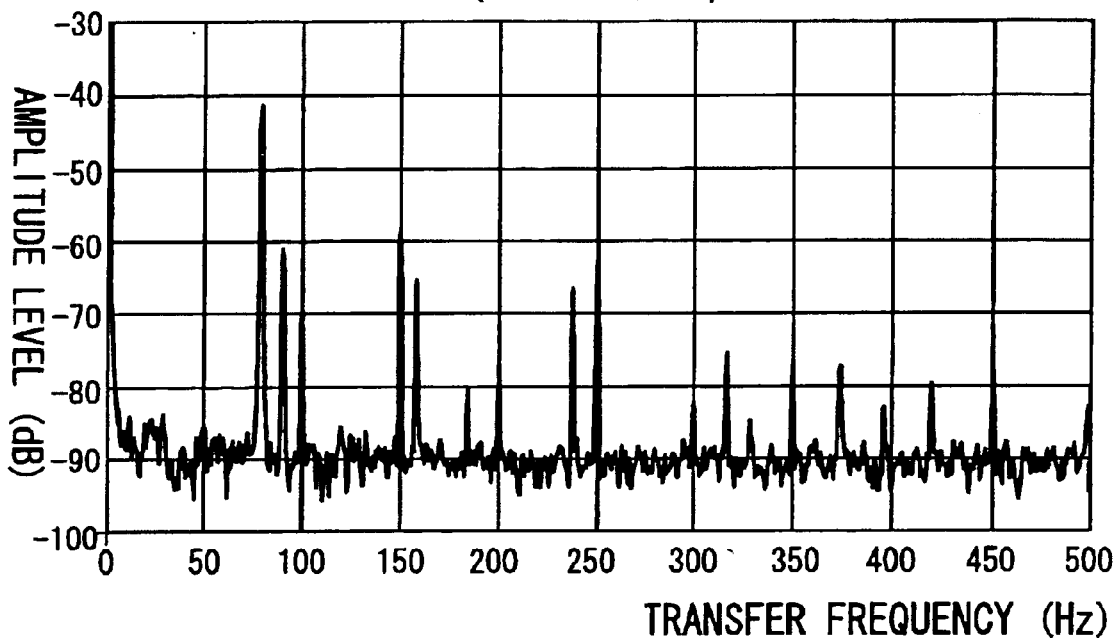
FIG. 9A is a graph illustrating the transfer vibration characteristic in the A-direction shown in FIG. 7 when the vibration damping apparatus does not include a spherical projection.
Figure 9B:
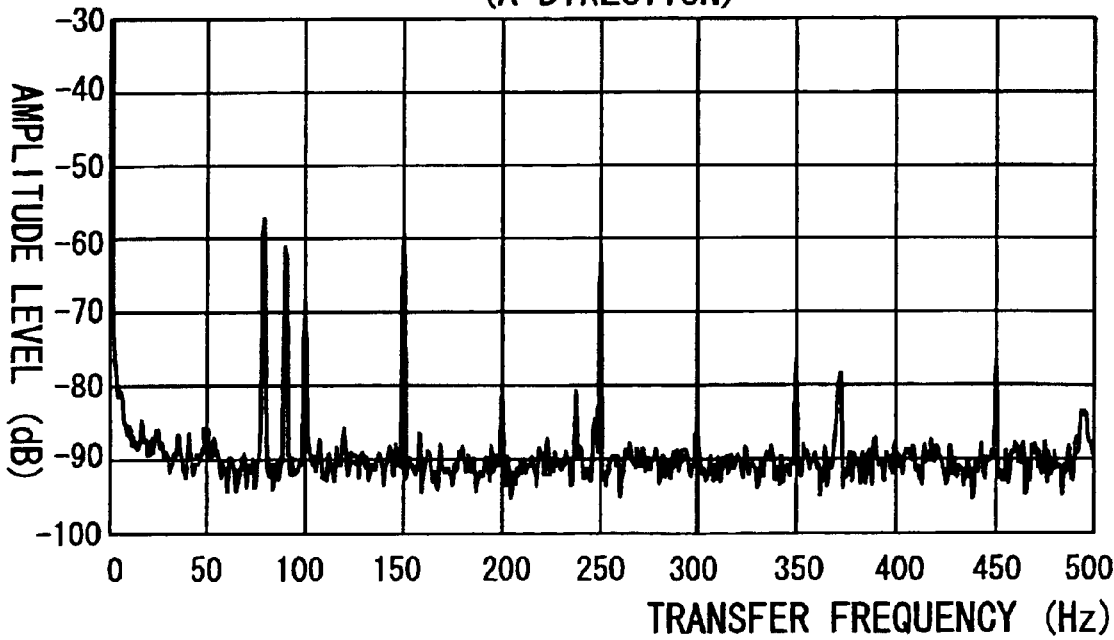
FIG. 9B is a graph illustrating the transfer vibration characteristic in the A-direction shown in FIG. 7 when the vibration damping apparatus includes a spherical projection.
Figure 10A:
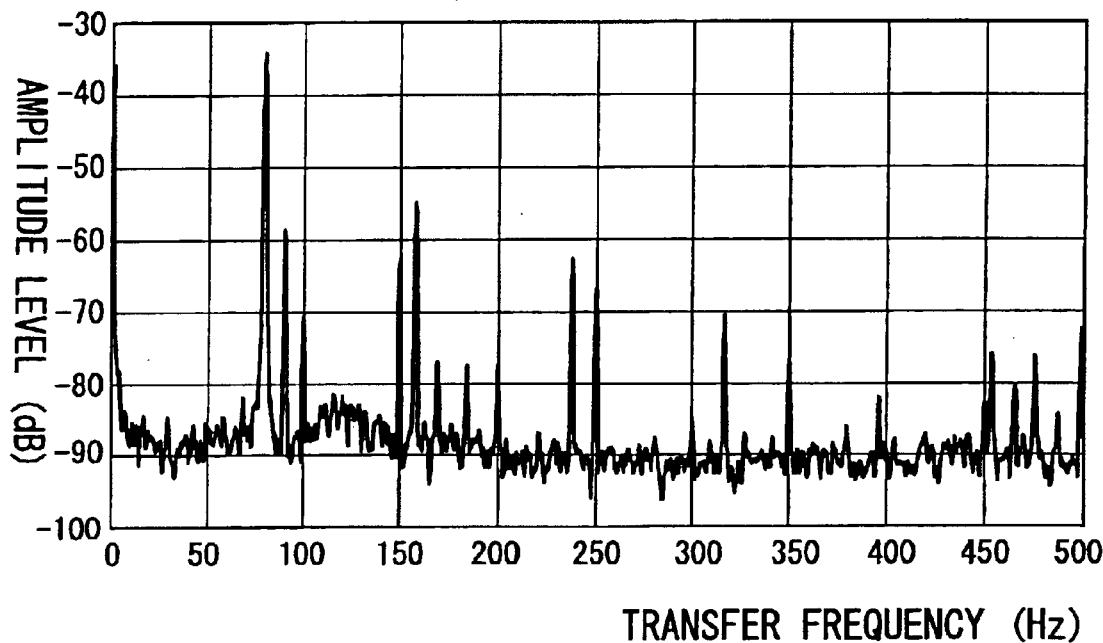
FIG. 10A is a graph illustrating the transfer vibration characteristic in the B-direction shown in FIG. 7 when the vibration damping apparatus does not include a spherical projection.
Figure 10B:
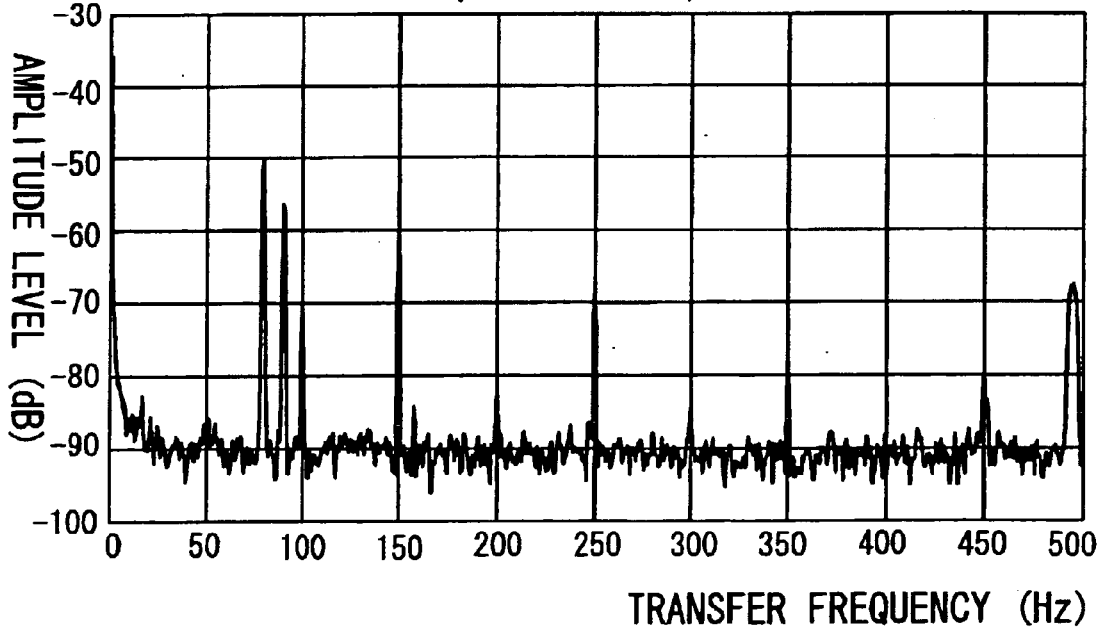
FIG. 10B is a graph illustrating the transfer vibration characteristic in the B-direction shown in FIG. 7 when the vibration damping apparatus includes a spherical projection.
Figure 11A:
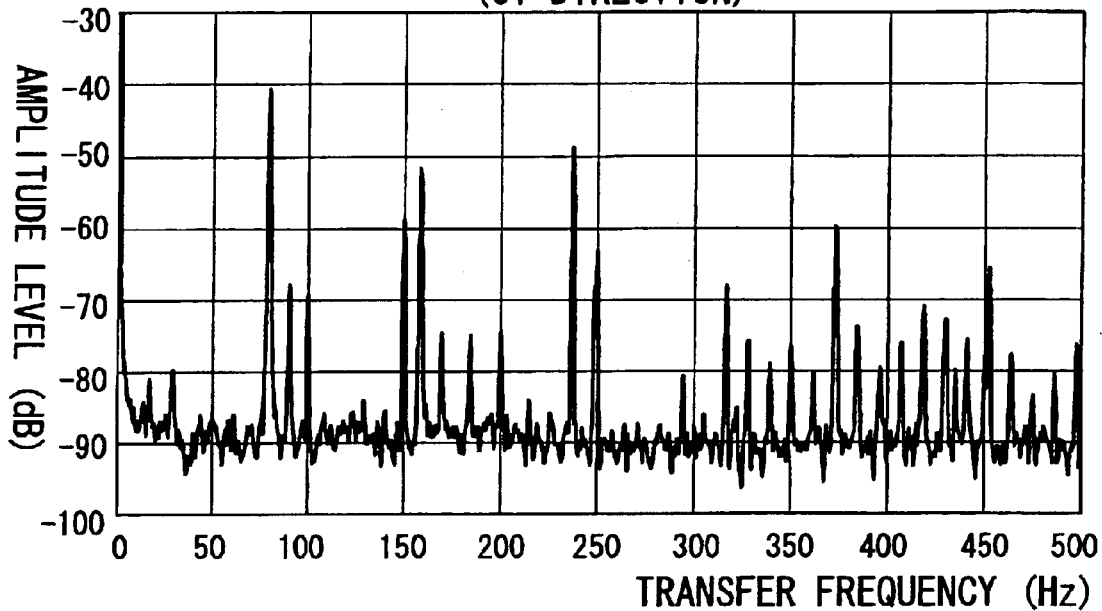
FIG. 11A is a graph illustrating the transfer vibration characteristic in the C1 direction at a corner of the hard disk drive apparatus as shown in FIG. 7 when the vibration damping apparatus does not include a spherical projection.
Figure 11B:
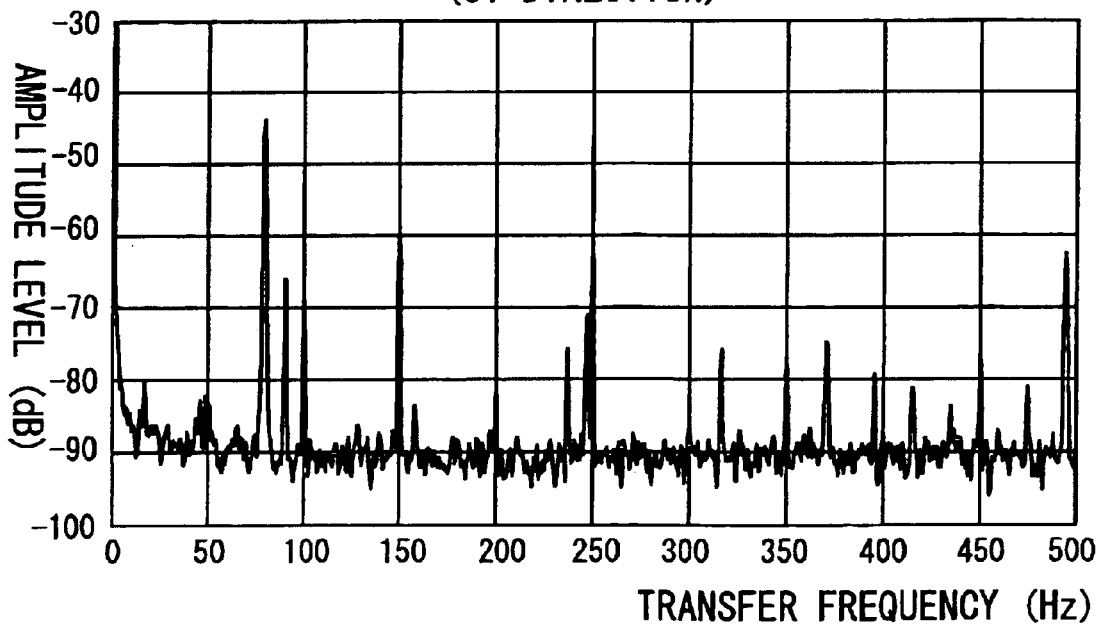
FIG. 11B is a graph illustrating the transfer vibration characteristic in the C1 direction at a corner of the hard disk drive apparatus as shown in FIG. 7 when the vibration damping apparatus includes a spherical projection.

FIG. 9A and FIG. 9B illustrate vibration transfer characteristics in the A-direction, FIG. 10A and FIG. 10B illustrate vibration transfer characteristics in the B-direction, FIG. 11A and FIG. 11B illustrate vibration transfer characteristics in the C1-direction, and FIG. 12A and FIG. 12B illustrate vibration transfer characteristics in the C2-direction. In addition, FIG. 9A, FIG. 1A, FIG. 11A, and FIG. 12A illustrate vibration transfer characteristics when the projections 42 in FIG. 3 of the present embodiment are not provided, and FIG. 9B, FIG. 10B, FIG. 11B, and FIG. 12B illustrate vibration transfer characteristics when the projections 42 are provided.

From the vibration transfer characteristics of FIG. 9A, FIG. 9B to FIG. 12A, FIG. 12B, it is clear that the projections 42 dampen the vibrations as compared to when there are no projections 42. In particular, the more the transfer frequency is raised, namely, the higher the frequency of primary vibrations, secondary vibrations, tertiary vibrations, etc., the less the vibrations are further decayed.

Another Embodiment

Figure 13:
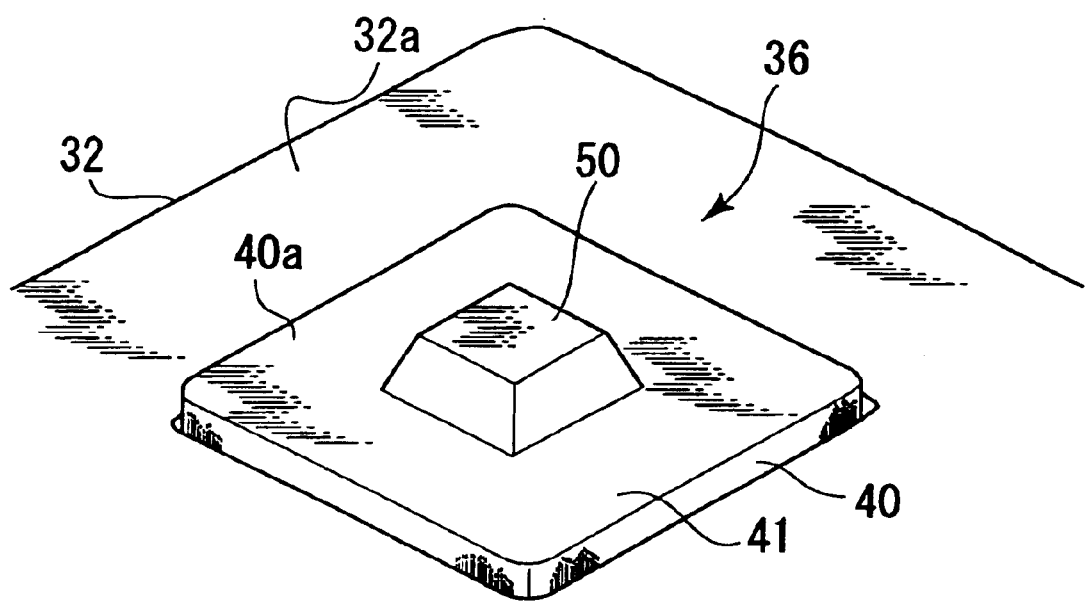
FIG. 13 is a partial enlarged perspective view illustrating the condition in which a vibration damping apparatus having an obelisk-shaped projection (albeit with a flat top) is mounted on the housing of the hard disk drive apparatus.

In the above-described embodiment, the projection 42 is described as having a spherical shape, however, for instance, as illustrated in FIG. 13, it is also possible to have a vibration damping apparatus 36 with a projection 50 which has an obelisk body with a flat tip. Similar to the projection 42 with the spherical shape, it is possible to dampen external vibrations traveling to the hard disk drive apparatus 4 when the projection has an obelisk-shaped body.

In the above-described embodiment, the entire vibration damping apparatus is preferably formed from an elastic material such as a synthetic resin material including rubber and resin. However, except for the elastic deformation section 41, parts of the vibration damping apparatus may be formed from a rigid material, such as a hard plastic material without elastic deformation. That is, when the vibration damping apparatus is formed so that only the elastic deformation section 41 acts elastically with deformation and other parts do not act elastically with deformation but rather are rigid, the same effect can be achieved.

In addition, in the above-described embodiment, the vibration damping apparatus of the present invention is applied to a hard disk drive apparatus. It is possible, however, to apply the vibration damping apparatus of the present invention to other apparatuses that are influenced by vibrations in connection with their recording, playing back, or recording/reproducing. For instance, if the vibration damping apparatus of the present invention is applied to electronic apparatus such as a CD-ROM drive apparatus, DVD drive apparatus, video tape recorder apparatus and so forth, it is possible to dampen external vibrations transferred to the apparatus.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A vibration damping apparatus, comprising:
a main body extending in an axial direction between one end adapted for connection to an object and another end;
a projection provided on the other end of the main body; and
an elastic deformation section provided on the main body between the one end and the projection, the elastic deformation section extending in a plane substantially perpendicular to the axial direction, whereby the projection is movable in response to actions of the elastic deformation section.

2. The vibration damping apparatus according to claim 1, wherein the main body has a placing surface, and the projection projects from the placing surface in a direction away from the one end.

3. The vibration damping apparatus according to claim 1, wherein the main body is formed from an elastic material.

4. The vibration damping apparatus according to claim 1, wherein the elastic deformation section is formed from an elastic material.

5. The vibration damping apparatus according to claim 4, wherein the one end of the main body is formed from a rigid material.

6. The vibration damping apparatus according to claim 4, wherein the projection is formed from a rigid material.

7. A vibration damping apparatus comprising:
a main body having one end adapted for connection to an object and another end;
a projection provided on the other end of the main body; and
an elastic deformation section provided on the main body between the one end and the projection such that the projection is movable in response to actions of the elastic deformation section, the elastic deformation section having a small thickness relative to the thickness of the main body.

8. A vibration damping apparatus comprising:
a main body having one end adapted for connection to an object and another end;
a projection provided on the other end of the main body, the projection having a spherical shape; and
an elastic deformation section provided on the main body between the one end and the projection such that the projection is movable in response to actions of the elastic deformation section.

9. A vibration damping apparatus comprising:
a main body having one end adapted for connection to an object and another end;
a projection provided on the other end of the main body, the projection having a truncated obelisk shape; and
an elastic deformation section provided on the main body between the one end and the projection such that the projection is movable in response to actions of the elastic deformation section.

10. An electronic apparatus, comprising:
a housing;
electronic components assembled within the housing;
a vibration damping apparatus including a main body extending in an axial direction between one end connected to the housing and another end;
a projection provided on the other end of the main body and adapted to contact a support surface for supporting the electronic apparatus; and
an elastic deformation section provided on the main body between the one end and the projection, the elastic deformation section extending in a plane substantially perpendicular to the axial direction, whereby the projection is movable in response to actions of the elastic deformation section.

11. The electronic apparatus according to claim 10, wherein the electronic components define an apparatus selected from the group consisting of a recording apparatus, a reproducing apparatus and a recording/reproducing apparatus.

12. The electronic apparatus according to claim 10, wherein the electronic components define a hard disk drive apparatus.

13. The electronic apparatus according to claim 10, wherein the main body of the vibration damping apparatus is formed from an elastic material.

14. The electronic apparatus according to claim 10, wherein the elastic deformation section of the vibration damping apparatus is formed from an elastic material.

15. The electronic apparatus according to claim 14, wherein the one end of the main body of the vibration damping apparatus is formed from a rigid material.

16. The electronic apparatus according to claim 14, wherein the projection of the vibration damping apparatus is formed from a rigid material.

17. An electronic apparatus comprising:
a housing;
electronic components assembled within the housing;
a vibration damping apparatus including a main body having one end connected to the housing and another end;
a projection provided on the other end of the main body and adapted to contact a support surface for supporting the electronic apparatus, the projection having a spherical shape; and
an elastic deformation section provided on the main body between the one end and the projection such that the projection is movable in response to actions of the elastic deformation section.

18. An electronic apparatus comprising:
a housing;
electronic components assembled within the housing;
a vibration damping apparatus including a main body having one end connected to the housing and another end;

a projection provided on the other end of the main body and adapted to contact a support surface for supporting the electronic apparatus, the projection having a truncated obelisk shape; and an elastic deformation section provided on the main body between the one end and the projection such that the projection is movable in response to actions of the elastic deformation section.

19. An apparatus, comprising:

a housing;

a vibration damping apparatus including a main body extending in an axial direction between one end connected to the housing and another end;

a projection provided on the other end of the main body and adapted to contact a support surface for supporting the apparatus; and an elastic deformation section provided on the main body between the one end and the projection, the elastic deformation section extending in a plane substantially perpendicular to the axial direction, whereby the projection is movable in response to actions of the elastic deformation section.

20. An apparatus comprising:

a housing;

a vibration damping apparatus including a main body having one end connected to the housing and another end;

a projection provided on the other end of the main body and adapted to contact a support surface for supporting the apparatus;

an elastic deformation section provided on the main body between the one end and the projection such that the projection is movable in response to actions of the elastic deformation section; and a cavity extending from the one end of the vibration damping apparatus into the main body thereof such that respective walls are formed at the main body and at the elastic deformation section, wherein the walls at the elastic deformation section are thinner than the walls of the main body.

* * * * *

UNITED STATES PATENT AND TRADEMARK OFFICE
CERTIFICATE OF CORRECTION

PATENT NO. : 6,714,405 B2
APPLICATION NO. : 10/139793
DATED : March 30, 2004
INVENTOR(S) : Keiji Jitsukawa It is certified that error appears in the above-identified patent and that said Letters Patent is hereby corrected as shown below:

Column 1, line 42, "projections" should read --projection,--.
Column 3, line 19, delete "-" after "recorded".
Column 4, line 27, delete "," after "connected".
Column 6, line 25, "c" should read --C--.

Signed and Sealed this

Sixth Day of March, 2007

JON W. DUDAS
*Director of the United States Patent and Trademark Office*